US012550165B2

(12) United States Patent
Kulkarni et al.

(10) Patent No.: US 12,550,165 B2
(45) Date of Patent: Feb. 10, 2026

(54) ENHANCED TRANSMIT OPPORTUNITY SHARING IN MULTIPLE ACCESS POINT COORDINATION

(71) Applicant: Cisco Technology, Inc., San Jose, CA (US)

(72) Inventors: Santosh B. Kulkarni, Sunnyvale, CA (US); Vishal S. Desai, San Jose, CA (US); Pooya Monajemi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 18/303,174

(22) Filed: Apr. 19, 2023

(65) Prior Publication Data

US 2024/0357619 A1 Oct. 24, 2024

(51) Int. Cl.
*H04W 72/27* (2023.01)
*H04W 64/00* (2009.01)
(Continued)

(52) U.S. Cl.
CPC .......... *H04W 72/27* (2023.01); *H04W 64/00* (2013.01); *H04W 72/0453* (2013.01); *H04W 72/12* (2013.01); *H04W 74/002* (2013.01)

(58) Field of Classification Search
None
See application file for complete search history.

(56) References Cited

U.S. PATENT DOCUMENTS

| 2018/0310133 A1 | 10/2018 | Ramasamy et al. |
| 2019/0028965 A1 | 1/2019 | Ponnuswamy |

(Continued)

FOREIGN PATENT DOCUMENTS

| WO | 2015127777 A1 | 9/2015 |
| WO | 2017190513 A1 | 11/2017 |

(Continued)

OTHER PUBLICATIONS

Partial International Search Report for International Application No. PCT/US2024/024560, mailed Jul. 10, 2024, 11 Pages.

(Continued)

*Primary Examiner* — Mohammad S Adhami
(74) *Attorney, Agent, or Firm* — Patterson + Sheridan, LLP

(57) ABSTRACT

Techniques and systems for enhancing transmit opportunity (TXOP) sharing for multi-access point coordination (MAPC) are described. An example technique includes obtaining, for each access point (AP) of a plurality of APs in a MAPC group, historical mobility information of client stations (STAs) associated with the AP. A number of the client STAs associated with each AP that satisfies a mobility criteria is determined based on the historical mobility information. A determination of whether to enable TXOP sharing is made for each AP and an indication of the determination is transmitted to the AP. Another technique includes estimating traffic demand for a first set of client STAs associated with an AP. A second set of client STAs to make available for TXOP sharing is determined. Signal strength information associated with a communication link between each client STA in the second set and the AP is transmitted.

20 Claims, 5 Drawing Sheets

(51) Int. Cl.
*H04W 72/0453* (2023.01)
*H04W 72/12* (2023.01)
*H04W 74/00* (2009.01)

(56) References Cited

U.S. PATENT DOCUMENTS

| | | | | |
|---|---|---|---|---|
| 2022/0394487 | A1* | 12/2022 | Cizdziel | H04W 16/10 |
| 2023/0048964 | A1* | 2/2023 | Seok | H04W 52/367 |
| 2023/0107240 | A1* | 4/2023 | Sundman | H04B 7/0452 |
| | | | | 370/329 |
| 2024/0235750 | A1* | 7/2024 | Omar | H04L 5/0035 |
| 2025/0048452 | A1* | 2/2025 | Shabdanov | H04W 74/085 |
| 2025/0150889 | A1* | 5/2025 | Cherian | H04W 74/04 |

FOREIGN PATENT DOCUMENTS

| | | | |
|---|---|---|---|
| WO | 2023004568 A1 | | 2/2023 |
| WO | WO2025053971 | * | 3/2025 |

OTHER PUBLICATIONS

D. Nunez et al., "TXOP Sharing with Coordinated Spatial Reuse in Multi-AP Cooperative IEEE 802.11BE WLANS," arxiv.org, dated Dec. 21, 2021.

International Search Report and Written Opinion for International Application No. PCT/US2024/024560, mailed Sep. 2, 2024, 17 Pages.

* cited by examiner

ENHANCED TRANSMIT OPPORTUNITY SHARING IN MULTIPLE ACCESS POINT COORDINATION

TECHNICAL FIELD

Embodiments presented in this disclosure generally relate to wireless communications. More specifically, embodiments disclosed herein relate to techniques for improving transmit opportunity sharing in multiple access point coordination deployments.

BACKGROUND

Wireless communication standards, such as the Institute of Electrical and Electronics Engineers (IEEE) 802.11 technical standard, are continuing to evolve to meet the ever increasing demands of bandwidth intensive and low latency services, such as augmented/extended reality and cloud gaming. For example, recent amendments to IEEE 802.11 (e.g., IEEE 802.11be amendment) aim to introduce higher data rates using higher modulation orders, larger channel widths, and additional spatial streams, as well as a set of new features such as multi-link operation (MLO) and multi access point coordination (MAPC).

MLO enables devices, such as access points (APs) and client stations (STAs), to simultaneously send and receive data across different frequency bands and channels. With MLO, multiple links can be established between the STA and AP to increase throughput, reduce latency, and improve reliability. MAPC allows an AP that wins contention to share its transmit opportunity (TXOP) with its peer APs and also allows the contention-winning AP to coordinate the available temporal, frequency, and spatial resources for the peer APs, improving the wireless performance in terms of throughput and latency.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
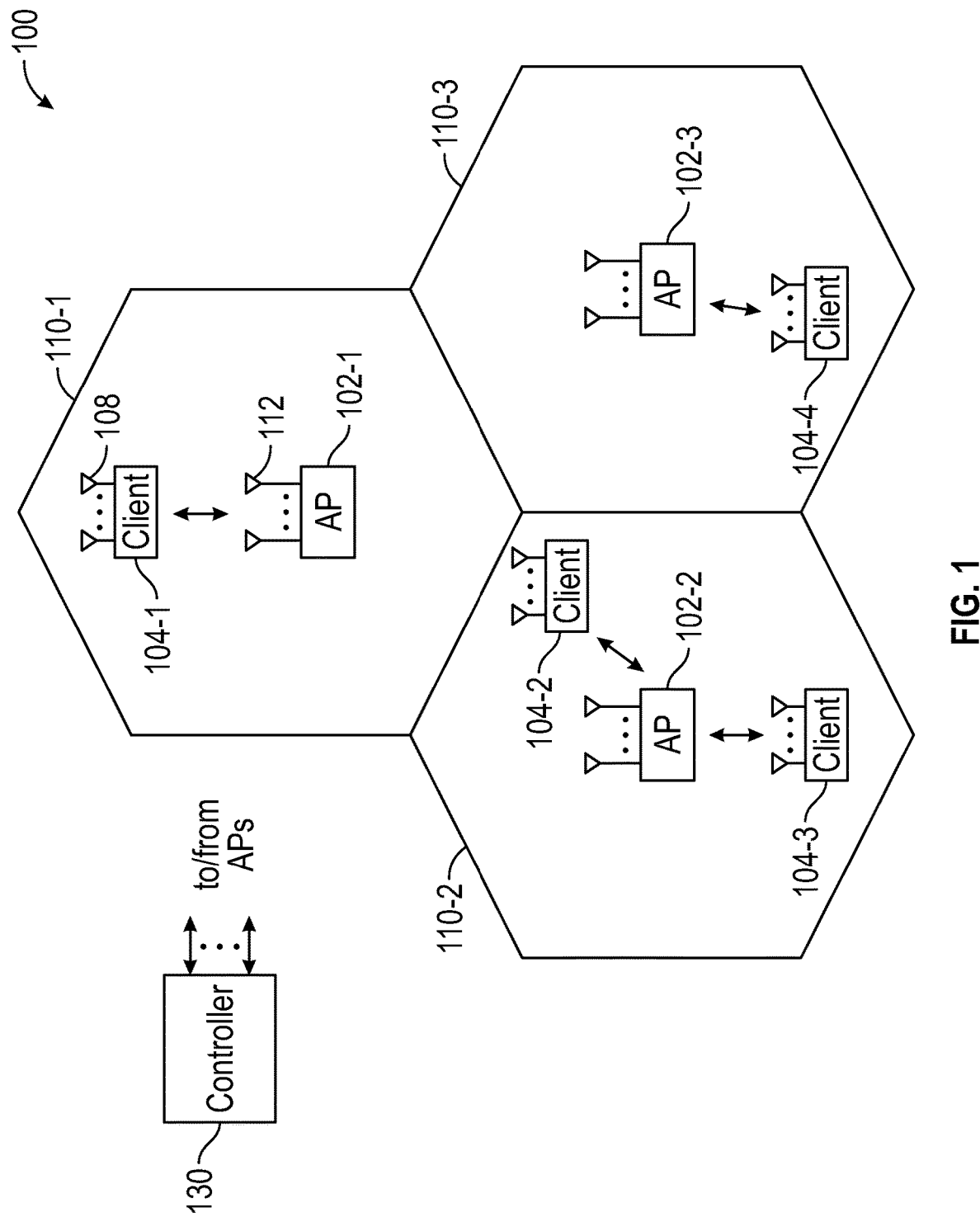
FIG. 1 illustrates an example system, according to one embodiment.

One embodiment described herein is a computer-implemented method. The computer-implemented method includes obtaining, for each access point (AP) of a plurality of APs in a multi-access point coordination group, historical mobility information of one or more client stations (STAs) associated with the AP. The computer-implemented method also includes determining, for each AP of the plurality of APs, a number of the one or more client STAs associated with the AP that satisfy a mobility criteria, based on the historical mobility information. The computer-implemented method also includes determining, for each AP of the plurality of APs, whether to enable transmit opportunity (TXOP) sharing for the AP in the multi-access point coordination group, based on the number of the one or more client STAs associated with the AP that satisfy the mobility criteria. The computer-implemented method further includes transmitting, to each AP of the plurality of APs, an indication of the determination of whether TXOP sharing is enabled for the AP.

Another embodiment described herein is a system. The system includes a memory and a processor communicatively coupled to the memory. The processor is configured to perform an operation. The operation includes obtaining, for each access point (AP) of a plurality of APs in a multi-access point coordination group, historical mobility information of one or more client stations (STAs) associated with the AP. The operation also includes determining, for each AP of the plurality of APs, a number of the one or more client STAs associated with the AP that satisfy a mobility criteria, based on the historical mobility information. The operation also includes determining, for each AP of the plurality of APs, whether to enable transmit opportunity (TXOP) sharing for the AP in the multi-access point coordination group, based on the number of the one or more client STAs associated with the AP that satisfy the mobility criteria. The operation further includes transmitting, to each AP of the plurality of APs, an indication of the determination of whether TXOP sharing is enabled for the AP.

Another embodiment described herein is a computer-implemented method. The computer-implemented is performed by an access point (AP). The computer-implemented method includes determining an estimated traffic demand for a first set of client STAs associated with the AP. The computer-implemented method also includes determining, from the first set of client STAs, a second set of client STAs to make available for transmit opportunity (TXOP) sharing with one or more other APs of a multi-access point coordination group. The computer-implemented method also includes obtaining, for each client STA of the second set of client STAs, signal strength information associated with a communication link between the client STA and the AP. The computer-implemented method further includes transmitting an indication of the signal strength information.

EXAMPLE EMBODIMENTS

The performance of conventional TXOP sharing may be limited in certain radio frequency (RF) environments, such as those having a large number of mobile STAs (e.g., STAs that meet a predefined mobility criteria or metric, as opposed to stationary STAs that do not meet the predefined mobility criteria), STAs transmitting different types of traffic, STAs with buffered traffic, and other dynamic characteristics. Because conventional TXOP sharing techniques may not be able to account for the dynamic characteristics of a given RF environment, using conventional TXOP sharing techniques in such environments can impact the performance of the TXOP sharing and, in turn, the performance of the wireless network.

To address this, embodiments described herein provides systems, devices, and techniques for enhancing the performance of TXOP sharing, for example, in MAPC deployments. As described herein, embodiments provide techniques that allow devices to leverage information associated with the RF environment existing among the coordinating APs when implementing TXOP sharing in MAPC. By leveraging such information, embodiments allow devices to implement TXOP sharing in a manner that is optimized for the current RF environment.

Note, the techniques described herein for enhancing TXOP sharing may be incorporated into (such as implemented within or performed by) a variety of wired or wireless apparatuses (such as nodes). In some implementations, a node includes a wireless node. Such wireless nodes may provide, for example, connectivity to or for a network (such as a wide area network (WAN) such as the Internet or a cellular network) via a wired or wireless communication link. In some implementations, a wireless node may include an AP or a controller.

FIG. 1 illustrates an example system 100 in which one or more techniques described herein can be implemented, according to one embodiment. As shown, the system 100 includes one or more APs (e.g., AP 102-1, AP 102-2, and AP 102-3), one or more client STAs (e.g., client STA 104-1, client STA 104-2, client STA 104-3, and client STA 104-4), and a controller 130. An AP is generally a fixed station that communicates with client STA(s) and may be referred to as a base station, wireless device, or some other terminology. A client STA may be fixed or mobile and also may be referred to as a mobile STA, a client, a STA, a wireless device, or some other terminology. Note that while a certain number of APs and client STAs are depicted, the system 100 may include any number of APs and client STAs.

As used herein, an AP along with the STAs associated with the AP (e.g., within the coverage area (or cell) of the AP) may be referred to as a basic service set (BSS). Here, AP 102-1 is the serving AP for client STA 104-1, AP 102-2 is the serving AP for client STAs 104-2 and 104-3, and AP 102-3 is the serving AP for client STA 104-4. The AP 102-1, AP 102-2, and AP 102-3 are neighboring (peer) APs. The APs 102 may communicate with one or more client STAs 104 on the downlink and uplink. The downlink (e.g., forward link) is the communication link from the AP 102 to the client STA(s) 104, and the uplink (e.g., reverse link) is the communication link from the client STA(s) 104 to the AP 102. In some cases, a client STA may also communicate peer-to-peer with another client STA.

As shown in FIG. 1, each client STA 104 includes one or more radios 108. The client STA 104 can use one or more of the radios 108 to form links with an AP 102. As also shown, each AP 102 includes one or more radios 112 that the AP 102 can use to form links with one or more client STAs 104. In general, the AP(s) 102 and the client STA(s) 104 may form any suitable number of links for communication using any suitable frequencies. In some instances, a client STA 104 may form multiple links with a single AP 102. Example hardware that may be included in an AP 102 and a client STA 104 is discussed in greater detail in regard to FIG. 5.

The controller 130 couples to and provides coordination and control for the APs 102 1-3. For example, the controller 130 may handle adjustments to RF power, channels, authentication, and security for the APs. The controller 130 may also coordinate the links formed by the client STA(s) 104 with the APs 102. In certain embodiments described herein, the controller 130 can enable or disable TXOP sharing for one or more of the APs 102. That is, the controller 130 can indicate which APs in a coordination group can participate in TXOP sharing.

In some embodiments, the controller 130 is included within or integrated with an AP 102 and coordinates the links formed by that AP 102 (or otherwise provides control for that AP). For example, each AP 102 may include a controller that provides control for that AP. In some embodiments, the controller 130 is separate from the APs 102 and provides control for those APs. In FIG. 1, for example, the controller 130 may communicate with the APs 102 1-3 via a (wired or wireless) backhaul. The APs 102 1-3 may also communicate with one another, e.g., directly or indirectly via a wireless or wireline backhaul. Example hardware that may be included in a controller 130 is discussed in greater detail with regard to FIG. 5.

Note, that in certain embodiments, one or more of the client STAs 104 may be referred to as STA multi-link devices (MLDs) (e.g., a STA or client device acting as a MLD) and/or one or more of the APs 102 may be referred to as AP MLDs (e.g., an AP that acts as a MLD). The STA MLD and AP MLD are generally representative of any device capable of performing multi-link operations. A MLD may generally be classified based on whether it is a single radio MLD or multi-radio MLD. Single radio MLDs generally use a single radio to switch between one or more links. One category of single radio MLDs is Enhanced Multi-Link Single Radio (eMLSR). eMLSR devices generally operate one main wireless radio that can transmit and/or receive data frames on a given link, but can detect some data (e.g., short initial frames) on a set of other links when the device is not actively transmitting or receiving. Multi-radio MLDs may generally be classified into the following two types: (i) simultaneous transmission and reception (STR) MLD and (ii) non-STR MLD. For STR MLDs, a transmission on one link may not affect the operations of frame reception and clear channel assessment (CCA) on other links. Stated differently, for STR MLDs, individual links can operate independently of each other. For non-STR MLDs, operation on one link may be restricted by operation on another link. For example, a transmission on one link may not be allowed if it will cause reception interruption on another link. In another example, a reception or CCA on one link may not be allowed if a transmission is ongoing on another link.

Figure 2:
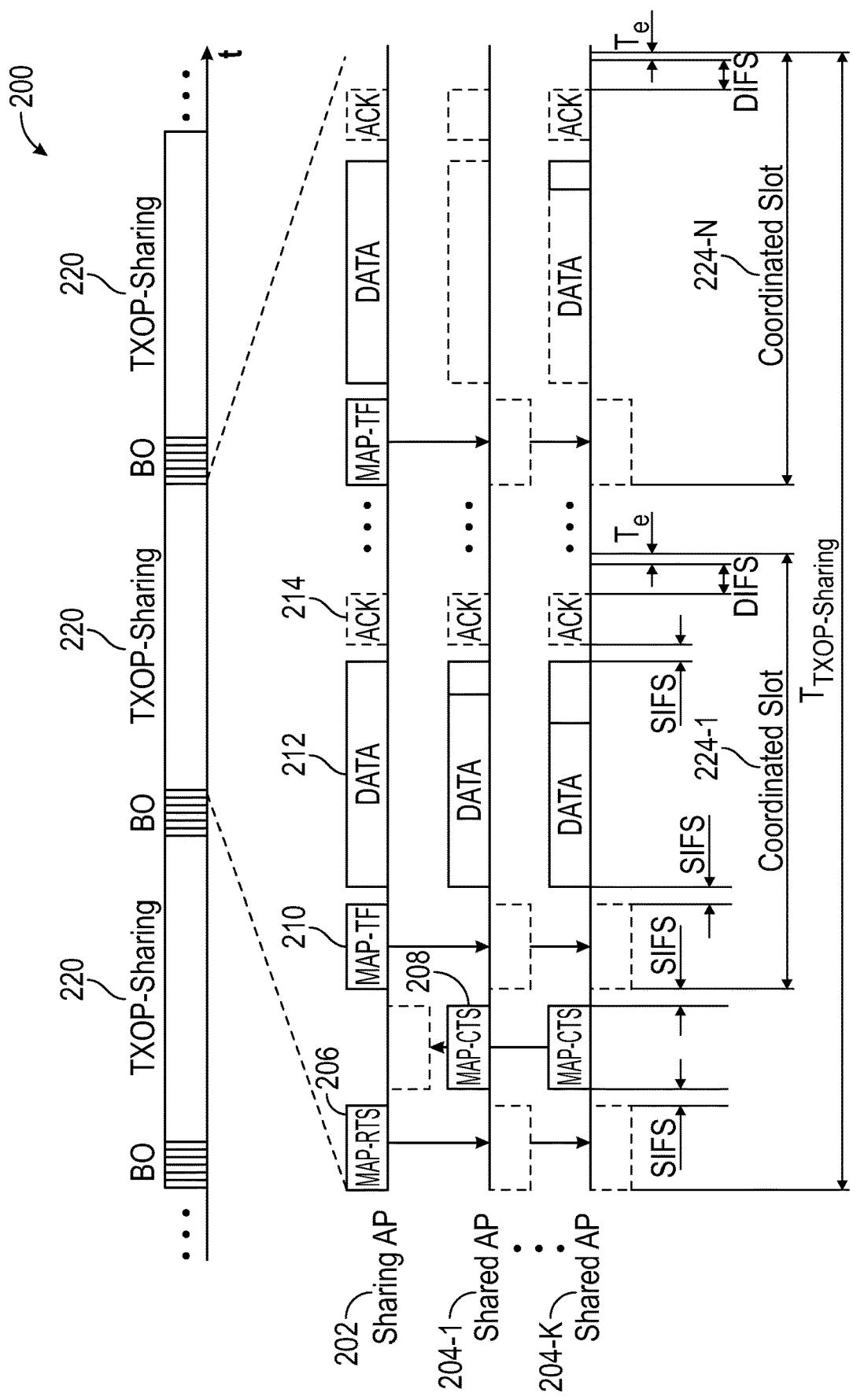
FIG. 2 illustrates an example TXOP sharing scheme.

In certain embodiments, one or more of the APs 102 may participate in TXOP sharing, e.g., as part of MAPC. To support TXOP sharing between APs 102, one of the APs 102 (e.g., AP 102-1) may act as the initiator and coordinate a shared transmission, while the other APs (e.g., APs 102-2 and 102-3) may follow the shared schedule. The AP initiating the shared transmission may be referred to as the "sharing AP," while the rest of the APs 102 may be referred to as the "shared APs." In one embodiment, the sharing AP is the AP that wins contention to the shared medium among the other APs. When the APs 102 form a coordination group, the sharing AP can distribute the time it has in its winning TXOP with the other APs 102 in the group. FIG. 2 illustrates an example coordinated time division multiple access (cTDMA) and coordinated spatial reuse (c-SR) mechanism 200, which are example, non-limiting, TXOP sharing implementations.

In FIG. 2, the sharing AP 202 and shared APs 204 1-K form a coordination group. The sharing AP 202 and the shared APs 204 are reference examples of the APs 102 depicted in FIG. 1. Here, a coordinated transmission (e.g., TXOP-sharing 220) starts with the sharing AP 202 sending a multi-access point (MAP) request-to-send (RTS) (MAP- RTS) frame 206. If there is no collision, the shared APs 204 reply at the same time with a MAP clear-to-send (CTS) (MAP-CTS) frame 208. At this point, the sharing AP 202 may assume that all devices in the network have properly set their network allocation vector (NAV), such that the multi-AP transmission will not be disturbed until it ends. After this setup, the sharing AP 202 may grant temporal or coordinated slots 224 to one or more of the shared APs 204 1-K in the coordination group.

To grant a coordinated slot 224, the sharing AP 202 sends a MAP trigger frame (MAP-TF) 210 to allocate the next coordinated slot (e.g., coordinated slot 224-1) to one or more shared APs 204. The MAP-TF 210 includes a set of configuration parameters, such as maximum physical layer convergence procedure (PLCP) protocol data unit (PPDU) length, coordinated slot duration, total bandwidth, modulation and coding scheme (MCS), and transmission power, for the shared APs 204 to use in their upcoming transmission 212 to their respective client STAs 104. The sharing AP 202 and shared APs 204 may then receive acknowledgments (ACKs) 214 from their respective client STAs 104. Note that, when a coordinated slot 224 is allocated to a single AP, the TXOP is shared following a conventional time division multiple access (TDMA) scheme. Otherwise, if several APs are allocated to the same slot, the TDMA may be enhanced with spatial reuse (SR).

Generally, the sharing AP 202 may use the received signal strength indicator (RSSI) received at the client STAs 104 from all APs in the coordination group. In FIG. 2, for example, the APs in the coordination group may participate in a sounding stage (e.g., prior to transmission of MAP-TF 210), in which the APs in the coordination group request the RSSI values from their associated client STAs 104 (e.g., RSSI values of all APs heard from each client STA 104). The client STAs 104 may collect RSSI information from beacon frames transmitted from the APs. This RSSI information may be periodically exchanged between the APs in the coordination group. The sharing AP 202 may use the RSSI values to determine which shared AP-STA links are scheduled in the different coordinated slots 224, the transmission power used by the shared AP, and the resulting signal-to-interference-plus-noise ratio (SINR) and MCS for each individual shared AP-STA link.

In certain RF environments, however, the TXOP sharing depicted in FIG. 2 can lead to sub-optimal performance of the network. That is, the TXOP sharing depicted in FIG. 2 may not allow for optimizing the allocation of coordinated slots to shared APs in RF environments having a larger number of mobile STAs, STAs transmitting different types of traffic, STAs having different capabilities, and other dynamic characteristics.

Accordingly, embodiments described herein provide techniques for enhancing TXOP sharing, such as the TXOP sharing depicted in FIG. 2, by leveraging information regarding the RF environment existing among the coordination group. In certain embodiments, such information may be obtained by a controller (e.g., controller 130). For example, the controller may include a radio resource management (RRM) and/or may obtain the information from a cloud-based location services platform communicatively coupled to the controller. In one embodiment, the controller may collect, as part of the information, historical client STA movement data for all APs (e.g., APs 102) in the coordination group.

In one embodiment, the controller dynamically enables or disables TXOP sharing for one or more APs in the coordination group, based on the historical client STA movement data. For example, if the controller determines, based on the historical client STA movement data, that a predetermined number of client STAs associated with certain APs in the coordination group are mobile (e.g., meet a predefined mobility metric), the controller may determine to disable TXOP sharing for those certain APs in the coordination group.

Consider, for example, an indoor environment with multiple floors, such as a two-story building. In such an example, a first set of APs may be deployed on the first floor to serve client STAs located on the first floor, and a second set of APs may be deployed on the second floor to serve client STAs located on the second floor. In such an environment, there may be larger number of client STAs that are mobile on the first floor compared to the second floor. However, in cases where a large number of client STAs are mobile, the AP-STA RSSIs that get reported to the sharing AP may be stale by the time the TXOP is shared. This, in turn, can cause transmission failures when shared TXOPs are scheduled. Accordingly, in the above example, the controller may determine to disable TXOP sharing among the first set of APs deployed on the first floor and enable TXOP sharing among the second set of APs deployed on the second floor.

Figure 3:
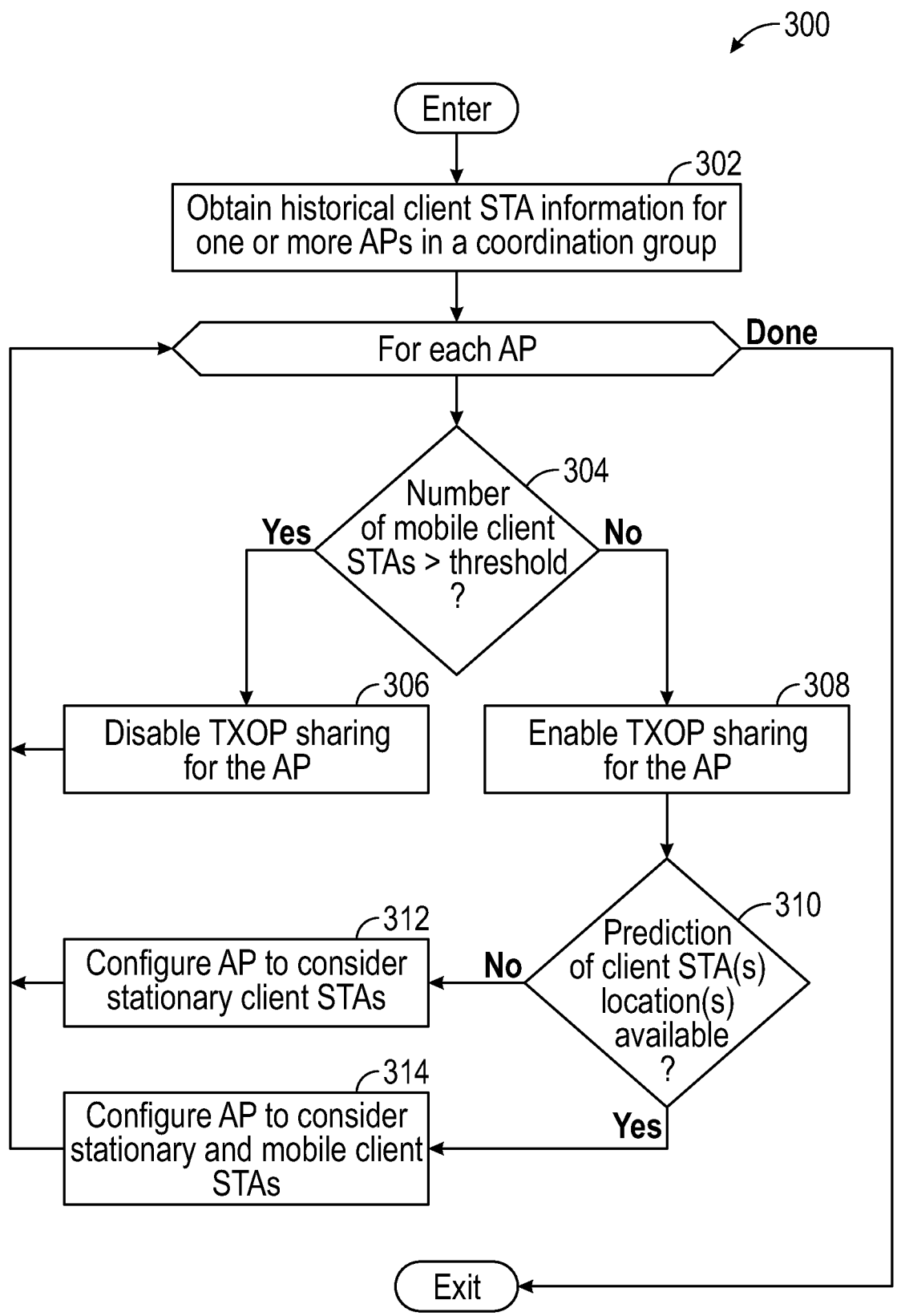
FIG. 3 is a flowchart of a method for optimizing TXOP sharing, according to one embodiment.

FIG. 3 is a flowchart of a method 300 for optimizing TXOP sharing among APs in a network, according to one embodiment. The method 300 may be performed by a controller (e.g., controller 130).

Method 300 enters at block 302, where the controller obtains historical client STA information for one or more APs (e.g., APs 102) in a coordination group. The APs in the coordination group may include a sharing AP (e.g., sharing AP 202) and one or more shared APs (e.g., shared APs 204). In one embodiment, the controller obtains the historical client STA information from RRM. For example, the controller may include an RRM component or may be communicatively coupled to a computing system with an RRM component. In another embodiment, the controller obtains the historical client STA information from a cloud-based location services platform.

The controller may perform block 304 for each AP in the coordination group. At block 304, the controller determines whether the number of client STAs associated with the AP that are mobile (e.g., satisfy a mobility criteria) is greater than a predetermined threshold. If so (e.g., the number of client STAs that satisfy the mobility criteria is greater than a predetermined threshold), then the controller disables TXOP sharing for the AP (block 306). If not (e.g., the number of client STAs that satisfy the mobility criteria is less than a predetermined threshold), then the controller enables TXOP sharing for the AP (block 308).

At block 310, the controller determines whether the locations of the client STAs associated with AP can be predicted. For example, the controller can check if a service, such as RRM or a cloud-based location services platform, can predict the location of the client STAs based on historical client movement data. If, at block 310, the controller determines that the locations of the client STAs cannot be determined or predicted (e.g., the service does not have a location prediction capability), then the controller configures the AP to consider stationary client STAs only for TXOP sharing (block 312). For example, the controller may transmit an indication to the AP to consider stationary client STAs only for TXOP sharing. The controller may limit TXOP sharing to stationary STAs that are associated with the sharing AP in order to minimize transmission failures during TXOP sharing.

On the other hand, if, at block 310, the controller determines that the locations of the client STAs can be determined or predicted, then the controller configures the AP to consider stationary and mobile client STAs for TXOP sharing (block 314). For example, the controller may transmit an indication to the AP to consider stationary and mobile client STAs.

Figure 4:
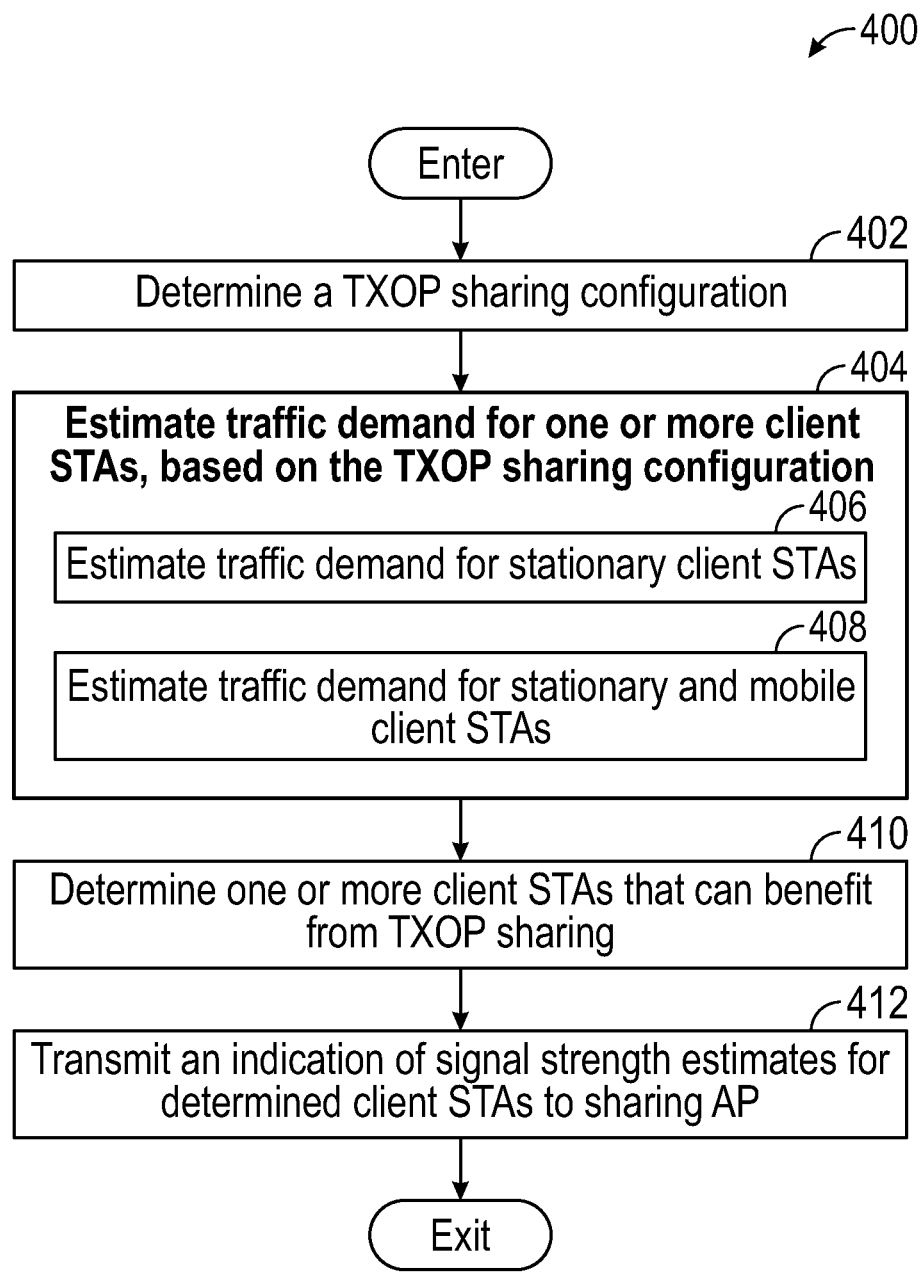
FIG. 4 is a flowchart of another method for optimizing TXOP sharing, according to one embodiment.

FIG. 4 is a flowchart of a method 400 for optimizing TXOP sharing among APs in a network, according to one embodiment. The method 400 may be performed by an AP (e.g., AP 102). In one embodiment, the method 400 is performed by each shared AP (e.g., shared AP 204) in a coordination group.

Method 400 enters at block 402, where the AP determines a TXOP sharing configuration. For example, the AP may obtain an indication of the TXOP sharing configuration transmitted from a controller (e.g., controller 130). In one embodiment, the TXOP sharing configuration indicates, for example, whether TXOP sharing is disabled for the AP or enabled for the AP. In embodiments where TXOP sharing is enabled for the AP, the TXOP sharing configuration may include an indication of whether the AP is to evaluate stationary client STAs, mobile client STAs, or a combination thereof.

At block 404, the AP estimates the traffic demand for one or more client STAs, based on the TXOP sharing configuration. Block 404 may include sub-block 406 or sub-block 408. At sub-block 406, the AP estimates the traffic demand for stationary client STAs only. At sub-block 408, the AP estimates the traffic demand for stationary and mobile client STAs.

At block 410, the AP determines one or more client STAs that can benefit from TXOP sharing. In one embodiment, the AP identifies, from the available client STAs under consideration, the set of client STAs that have buffered traffic and determines this set of client STAs as the client STAs that can benefit from TXOP sharing. In another embodiment, the AP identifies, from the available client STAs under consideration, single radio client STAs and eMLSR client STAs, and determines this set of client STAs as the client STAs that can benefit from TXOP sharing.

At block 412, the AP transmits an indication of signal strength estimates (e.g., RSSI estimates) for the determined client STAs to the sharing AP for the coordination group. For example, if the determined client STAs (in block 410) are client STAs with buffered traffic, then the AP may report the estimated AP-STA RSSI links for client STAs with buffered traffic. On the other hand, if the determined client STAs (in block 410) are single radio devices or eMLSR devices, then the AP may report the estimated AP-STA RSSI links for single radio or eMLSR client STAs, since these devices can transmit or receive on a single link.

Figure 5:
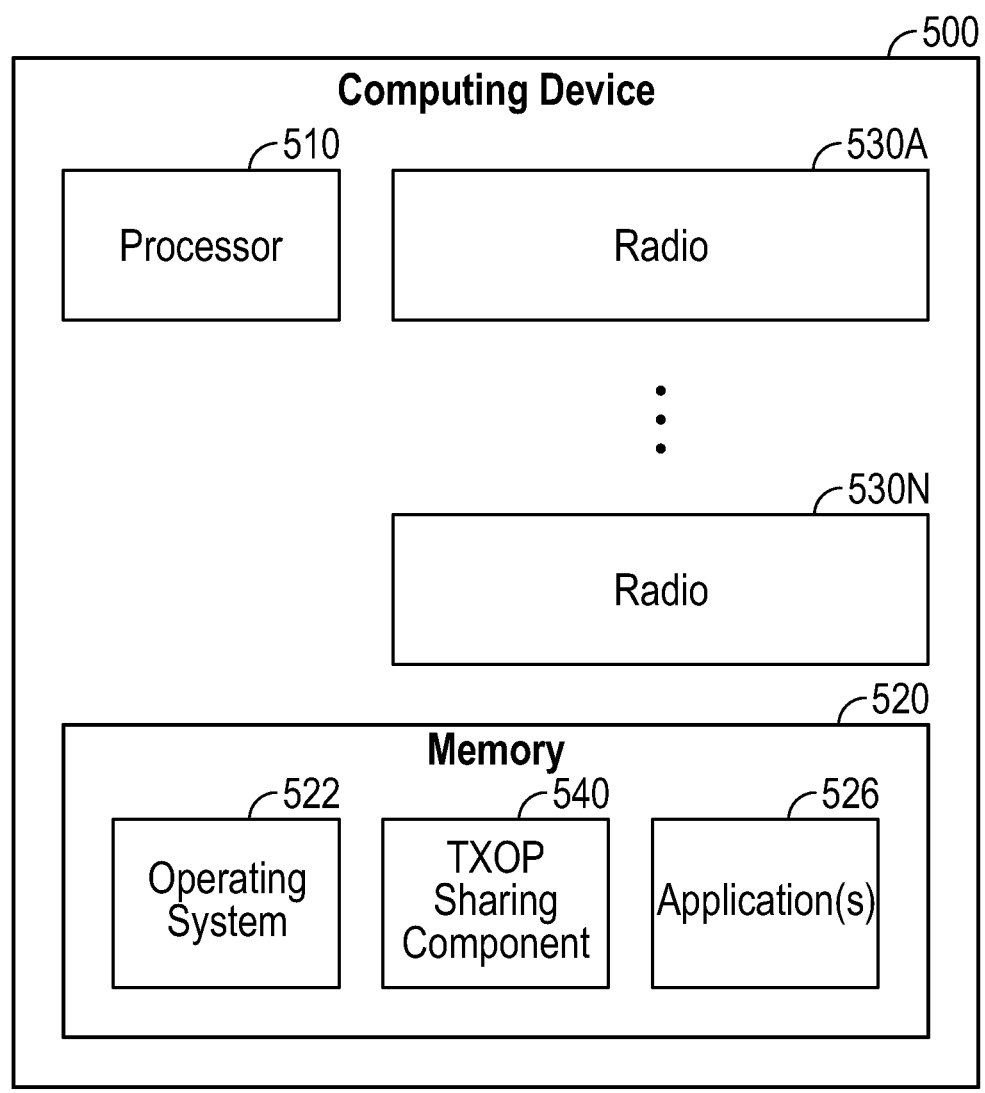
FIG. 5 illustrates an example computing device, according to one embodiment.

FIG. 5 illustrates an example computing device 500, according to one embodiment. The computing device 500 can be configured to perform one or more techniques described herein for optimizing TXOP sharing. For example, the computing device 500 can perform method 300, method 400, and any other techniques (or combination of techniques) described herein. The computing device 500 can be an AP (e.g., AP 102) or a controller (e.g., controller 130). The computing device 500 includes a processor 510, a memory 520, and one or more radios 530*a-n* (generally, radio 530).

The processor 510 may be any processing element capable of performing the functions described herein. The processor 510 represents a single processor, multiple processors, a processor with multiple cores, and combinations thereof. The radios 530 facilitate communications between the computing device 500 and other devices. The radios 530 are representative of communication interfaces, such as wireless communications antennas and various wired communication ports. The memory 520 may be either volatile or non-volatile memory and may include RAM, flash, cache, disk drives, and other computer readable memory storage devices. Although shown as a single entity, the memory 520 may be divided into different memory storage elements such as RAM and one or more hard disk drives.

As shown, the memory 520 includes various instructions that are executable by the processor 510 to provide an operating system 522 to manage various functions of the computing device 500. The memory 520 also includes a TXOP sharing component 540 configured to perform one or more techniques described herein, and one or more application(s) 526.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method comprising:
   obtaining, for each access point (AP) of a plurality of APs in a multi-access point coordination group, historical mobility information of one or more client stations (STAs) associated with the AP;
   determining, for each AP of the plurality of APs, a number of the one or more client STAs associated with the AP that satisfy a mobility criteria, based on the historical mobility information;
   determining, for each AP of the plurality of APs, whether to enable transmit opportunity (TXOP) sharing for the AP in the multi-access point coordination group, based on the number of the one or more client STAs associated with the AP that satisfy the mobility criteria; and
   transmitting, to each AP of the plurality of APs, an indication of the determination of whether TXOP sharing is enabled for the AP.

2. The computer-implemented method of claim 1, wherein determining whether to enable TXOP sharing comprises determining to enable TXOP sharing for the AP when the number of the one or more client STAs associated with the AP that satisfy the mobility criteria is less than a threshold.

3. The computer-implemented method of claim 2, further comprising, for each AP of the plurality of APs that has TXOP sharing enabled:
   determining whether one or more predicted location estimates for at least one client STA associated with the AP is available; and
   determining a set of client STAs associated with the AP that are available for TXOP sharing, based at least in part on the determination of whether the one or more predicated location estimates is available.

4. The computer-implemented method of claim 3, further comprising transmitting, to each AP of the plurality of APs that has TXOP sharing enabled, an indication of the set of client STAs associated with the AP that are available for TXOP sharing.

5. The computer-implemented method of claim 3, wherein the set of client STAs comprises stationary client STAs.

6. The computer-implemented method of claim 3, wherein the set of client STAs comprises mobile client STAs and stationary client STAs.

7. The computer-implemented method of claim 1, wherein determining whether to enable TXOP sharing comprises determining to disable TXOP sharing for the AP when the number of the one or more client STAs associated with the AP that satisfy the mobility criteria is greater than or equal to a threshold.

8. A system comprising
   a memory; and
   a processor communicatively coupled to the memory, the processor being configured to perform an operation comprising:
      obtaining, for each access point (AP) of a plurality of APs in a multi-access point coordination group, historical mobility information of one or more client stations (STAs) associated with the AP;
      determining, for each AP of the plurality of APs, a number of the one or more client STAs associated with the AP that satisfy a mobility criteria, based on the historical mobility information;
      determining, for each AP of the plurality of APs, whether to enable transmit opportunity (TXOP) sharing for the AP in the multi-access point coordination group, based on the number of the one or more client STAs associated with the AP that satisfy the mobility criteria; and transmitting, to each AP of the plurality of APs, an indication of the determination of whether TXOP sharing is enabled for the AP.

9. The system of claim 8, wherein determining whether to enable TXOP sharing comprises determining to enable TXOP sharing for the AP when the number of the one or more client STAs associated with the AP that satisfy the mobility criteria is less than a threshold.

10. The system of claim 9, the operation further comprising, for each AP of the plurality of APs that has TXOP sharing enabled:

determining whether one or more predicted location estimates for at least one client STA associated with the AP is available; and determining a set of client STAs associated with the AP that are available for TXOP sharing, based at least in part on the determination of whether the one or more predicated location estimates is available.

11. The system of claim 10, the operation further comprising transmitting, to each AP of the plurality of APs that has TXOP sharing enabled, an indication of the set of client STAs associated with the AP that are available for TXOP sharing.

12. The system of claim 10, wherein the set of client STAs comprises stationary client STAs.

13. The system of claim 10, wherein the set of client STAs comprises mobile client STAs and stationary client STAs.

14. The system of claim 8, wherein determining whether to enable TXOP sharing comprises determining to disable TXOP sharing for the AP when the number of the one or more client STAs associated with the AP that satisfy the mobility criteria is greater than or equal to a threshold.

15. A non-transitory computer-readable storage medium comprising computer-executable code, which when executed by one or more processors of a computing device, cause the computing device to perform an operation comprising:

obtaining, for each access point (AP) of a plurality of APs in a multi-access point coordination group, historical mobility information of one or more client stations (STAs) associated with the AP;

determining, for each AP of the plurality of APs, a number of the one or more client STAs associated with the AP that satisfy a mobility criteria, based on the historical mobility information;

determining, for each AP of the plurality of APs, whether to enable transmit opportunity (TXOP) sharing for the AP in the multi-access point coordination group, based on the number of the one or more client STAs associated with the AP that satisfy the mobility criteria; and transmitting, to each AP of the plurality of APs, an indication of the determination of whether TXOP sharing is enabled for the AP.

16. The non-transitory computer-readable storage medium of claim 15, wherein determining whether to enable TXOP sharing comprises determining to enable TXOP sharing for the AP when the number of the one or more client STAs associated with the AP that satisfy the mobility criteria is less than a threshold.

17. The non-transitory computer-readable storage medium of claim 16, the operation further comprising, for each AP of the plurality of APs that has TXOP sharing enabled:

determining whether one or more predicted location estimates for at least one client STA associated with the AP is available; and determining a set of client STAs associated with the AP that are available for TXOP sharing, based at least in part on the determination of whether the one or more predicated location estimates is available.

18. The non-transitory computer-readable storage medium of claim 17, the operation further comprising transmitting, to each AP of the plurality of APs that has TXOP sharing enabled, an indication of the set of client STAs associated with the AP that are available for TXOP sharing.

19. The non-transitory computer-readable storage medium of claim 17, wherein the set of client STAs comprises stationary client STAs.

20. The non-transitory computer-readable storage medium of claim 17, wherein the set of client STAs comprises mobile client STAs and stationary client STAs.

* * * * *